(12) United States Patent
Bender

(10) Patent No.: US 6,464,371 B2
(45) Date of Patent: Oct. 15, 2002

(54) TABLE WITH LIGHT DIFFUSING CENTRAL COLUMN

(76) Inventor: Chad Louis Bender, 6748 Whispering Pines Rd., Orlando, FL (US) 32824

( * ) Notice: Subject to any disclaimer, the term of this patent is extended or adjusted under 35 U.S.C. 154(b) by 0 days.

(21) Appl. No.: 09/756,342

(22) Filed: Jan. 8, 2001

(65) Prior Publication Data

US 2002/0126499 A1 Sep. 12, 2002

(51) Int. Cl.[7] ............................................... A47B 23/06

(52) U.S. Cl. ........................ 362/127; 362/33; 362/293; 362/134

(58) Field of Search ........................ 362/127, 33, 293, 362/583, 123, 134

(56) References Cited

U.S. PATENT DOCUMENTS

| | | | | | |
|---|---|---|---|---|---|
| 1,163,647 | A | * | 12/1915 | Dick | 101/128.4 |
| 2,090,248 | A | * | 8/1937 | Chakow | 108/23 |
| 3,244,868 | A | * | 4/1966 | Goetz | 362/92 |
| 4,807,095 | A | * | 2/1989 | Bell | 362/127 |
| 5,189,982 | A | * | 3/1993 | Liu | 119/247 |
| 5,911,496 | A | * | 6/1999 | Hojnacki | 362/131 |

* cited by examiner

Primary Examiner—Sandra O'Shea
Assistant Examiner—Ronald E. DelGizzi
(74) Attorney, Agent, or Firm—John Wiley Horton

(57) ABSTRACT

A table having a light source diffused throughout its structure. The intensity and color of the light source can be varied using remote controlling devices. The color and intensity of the light emanating from the table may thus be synchronized with music or other entertainment media.

8 Claims, 8 Drawing Sheets

TABLE WITH LIGHT DIFFUSING CENTRAL COLUMN

BACKGROUND

1. Field of Invention

This invention relates to the field of fixture. More specifically, the invention comprises a table having a light source diffused throughout its structure. The intensity and color of the light source can be varied using remote controlling devices. The color and intensity of the light emanating from the table may thus be synchronized with music or other entertainment media

2. Description of Prior Art

The use of diffused and reflected light is well known in the prior art. U.S. Pat. No. 4,951,181 to Phillips (1990) discloses one such device. The Phlllips invention comprises a light source within a glass block structure. The diffusing properties of the glass block structure spread the light to create a soft and uniform distribution, resulting in a pleasing effect.

A similar concept is applied to different application in U.S. Pat. No. 4,472,437 to Downey (1988). The Downey device uses a light source directed through several holes to illuminate a water bed mattress. The mattress, which is made of a translucent material, is covered with translucent fabric. The result is that the water within the water bed mattress diffuse the light to illuminate the mattress. Colored filters may be placed over the holes to create different color combinations.

Diffused illumination is also employed in U.S. Pat. No. 5,951,154 to Carel et.al. (1999). The '154 device uses a wrap-around lighting element diffused through stained glass. All these inventions employ diffused light to create a pleasing effect. However, all are static in nature; i.e., the intensity and color of the light does not change. In addition, all are conventional in that they simply project light through a translucent surface or surfaces. While this technique creates a pleasing effect, it is not sufficiently novel to entertain.

OBJECTS AND ADVANTAGES

Accordingly, several objects and advantages of the present invention are:

1. To provide a table having a diffused internal illumination, the intensity and color of which can be changed;

2. To provide a table having a visually striking illumination effect; and

3. To provide means for remotely controlling the intensity and color of the light source within the table in order to synchronize the visual effect with music or other entertainment.

DRAWING FIGURES

REFERENCE NUMERALS IN DRAWINGS

| 10 | table | 12 | base |
|---|---|---|---|
| 14 | top | 16 | column |
| 18 | brace | 20 | light source |
| 22 | column interior | 24 | column mount |
| 26 | light ray | 28 | outer surface |
| 30 | inner surface | 32 | center hole |
| 34 | battery | 36 | control module |
| 38 | gear motor | 40 | color wheel |
| 42 | table cloth | 44 | modified table cloth |
| 46 | cloth hole | 48 | centerpiece |
| 50 | diffused light | 52 | color filter |

DESCRIPTION OF THE INVENTION

Figure 1:
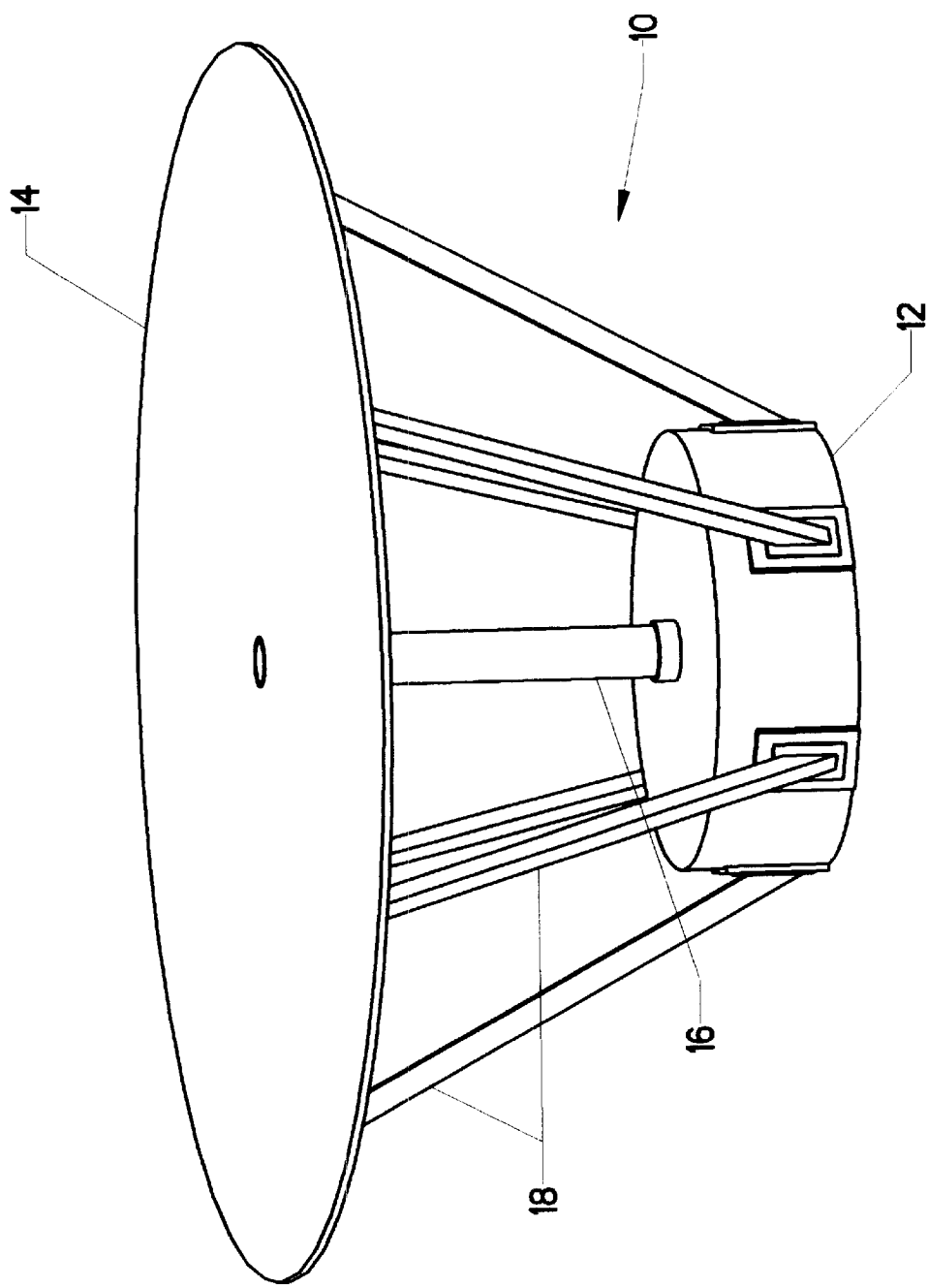
FIG. 1 is an isometric view, showing the proposed invention.

FIG. 1 depicts table 10 in its assembled form Base 12 is hollow, containing additional components which will be described subsequently. It is also substantially opaque. Column 16 extends upward from base 12 to top 14. Column 16 is a hollow acrylic tube. Top 14 is made from flat acrylic plate.

A multitude of aluminum braces 18 are added to make the structure more rigid. As the invention is designed to transmit and diffuse light in order to create visual effects, it is significant that column 16 and top 14 are made of transparent materials. Clear acrylic is used because it is relatively inexpensive and durable. However, conventional glass or other transparent materials could be substituted.

Figure 2:
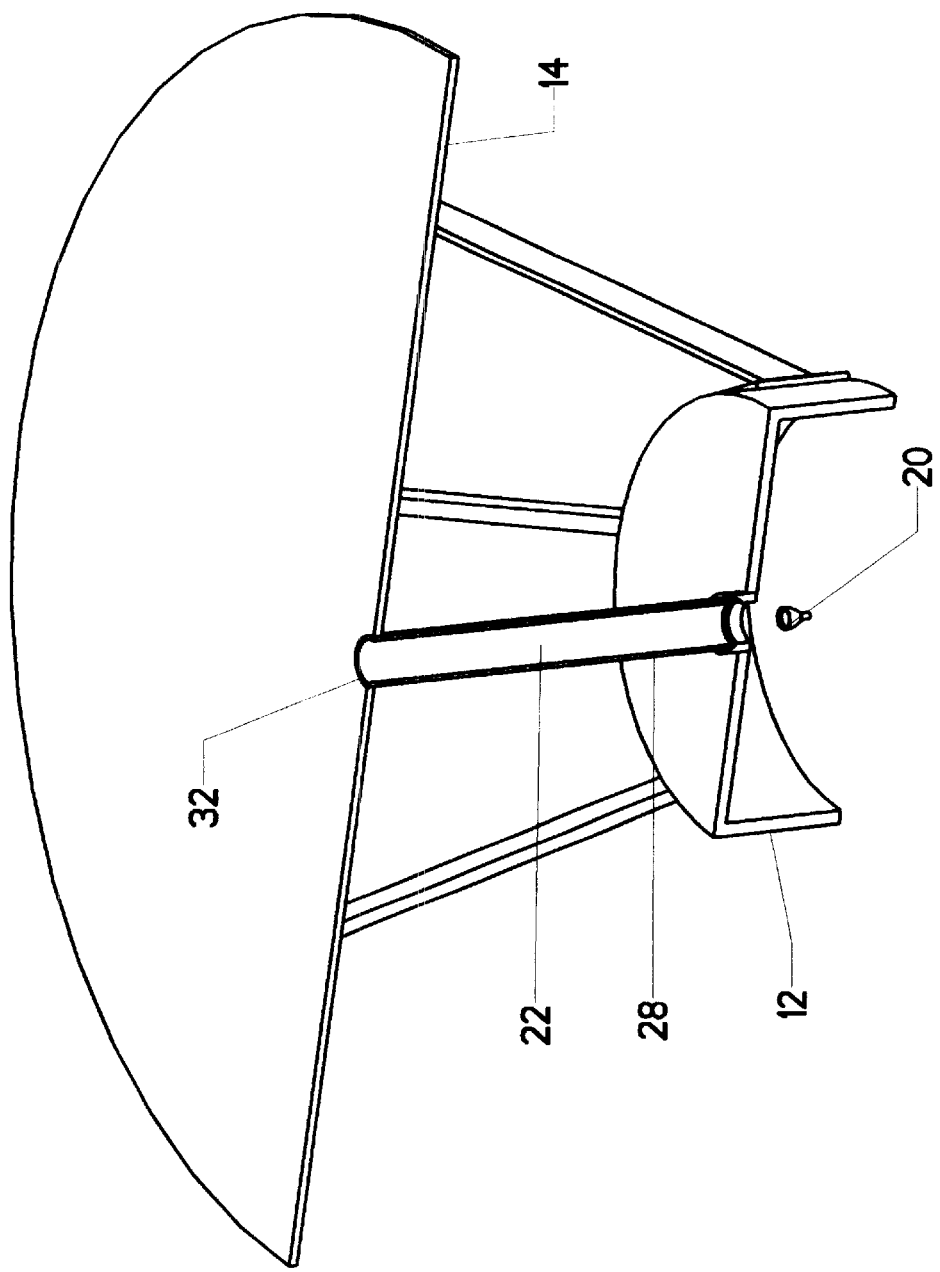
FIG. 2 is an isometric section view, showing the location of the illumination source.

FIG. 2 shows the proposed invention with the front half cut away for illustration purposes. The reader will observe that light source 20 is positioned to shine up through column interior 22 and ultimately out through center hole 32. Light source 20 is fixed within base 12 by any conventional means. For purposes of visual clarity, these fixing means have not been illustrated.

Figure 3:
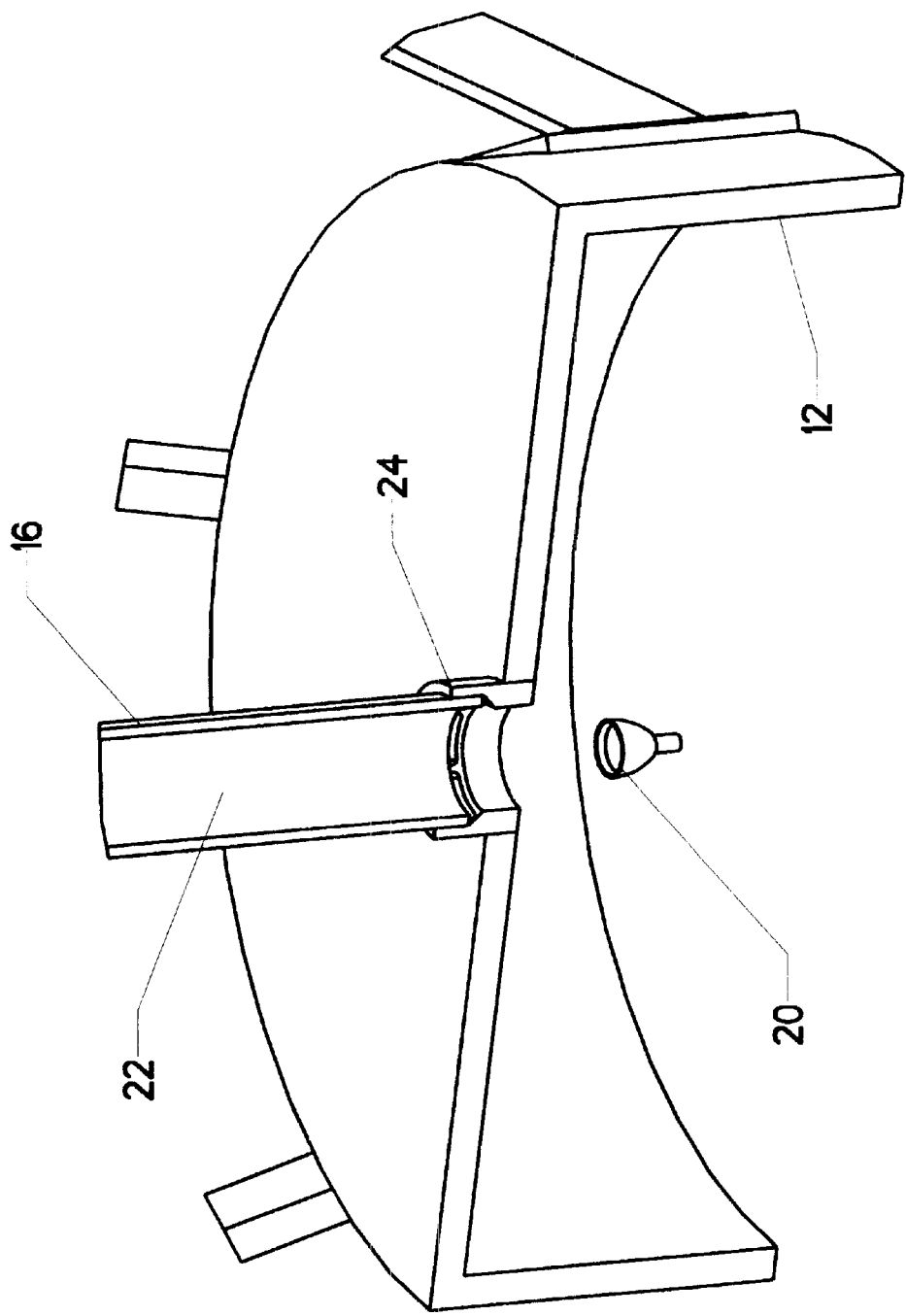
FIG. 3 is a detail view, showing more detail of the components depicted in FIG. 2.

Light source 20 projects a fairly focused beam of light, preferably having an angle of divergence between 5 and 15 degrees. While the exact nature of light source 20 is not critical, a battery powered halogen bulb is suitable. FIG. 3, also a cutaway or section view, shows the relationship of light source 20 to column 16 in greater detail. Column mount 24 is attached to base 12. Column 16 fits into column mount 24 and is thereby secured with its open lower end directly over light source 20 . The reader will observe that column mount 24 has a hollow interior allowing the light to pass through it and into column interior 22.

Figure 4:
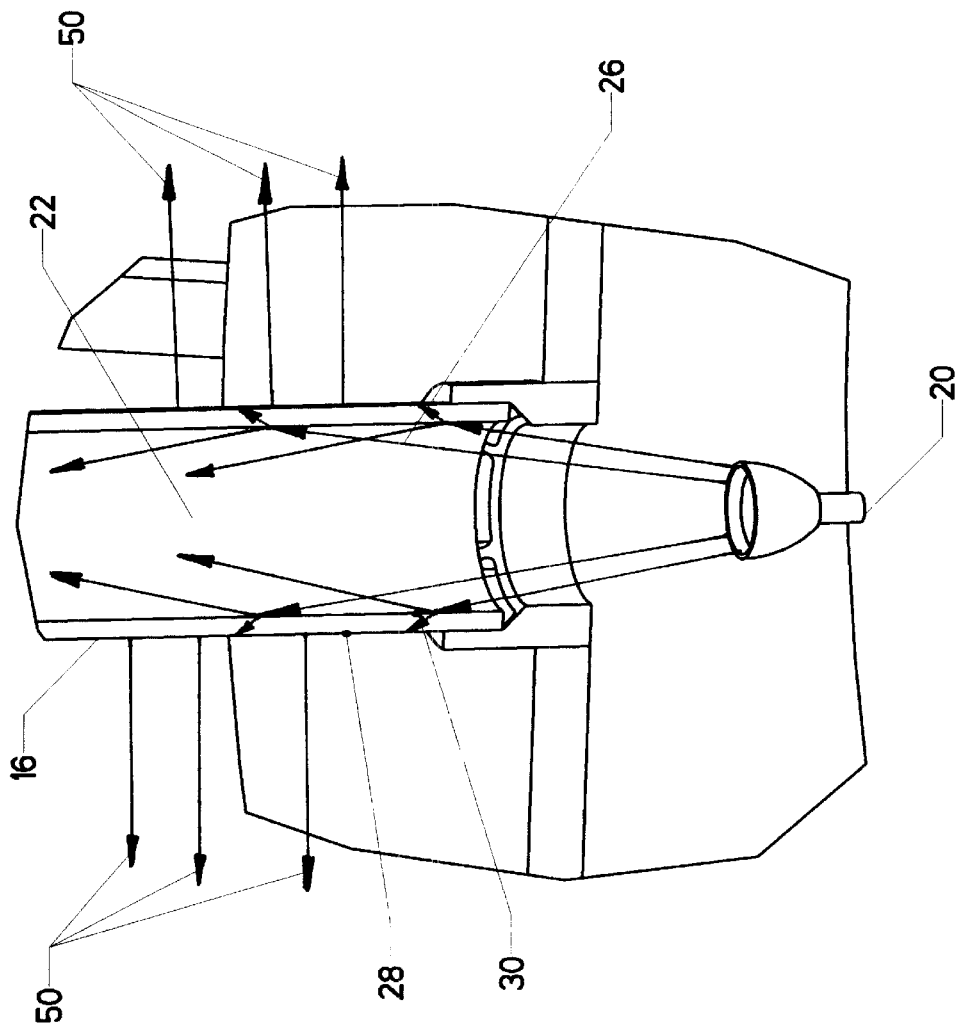
FIG. 4 is a detail view, showing how the light within the invention is transmitted and he column.

FIG. 4 is critical to understanding the operation of the invention. Light source 20 emits light rays 26 within column interior 22. These strike inner surface 30. Inner surface 30 is smooth and optically clear. Those skilled in the art will realize that when a light ray 26 strikes inner surface 30, a portion is reflected back within column interior 22 and a portion is refracted within the wall of column 16. The reflected portion continues upward through column interior 22, but the refracted portion encounters outer surface 28. Outer surface 28 has a finely textured surface such as the finish on a ground glass plate. As a result, outer surface 28 reflects very little light back toward column interior 22. Instead. Outer surface 26 diffuses the light outward as diffused light 50. The result is a very evenly distributed illumination source on outer surface 26.

The texture required on outer surface 28 may be obtained by a variety of conventional means. Sandblasting, followed by treatment with mineral oils has been found to be particularly effective. Chemical etching could also be employed, as well as the addition of an adhesive diffusion film. Each of these approaches would produce the desired effect.

Returning briefly now to FIG. 2, those skilled in the art will appreciate that the invention creates a diffused light source on outer surface 28. Some light rays are also directed out center hole 32. In addition, because top 14 is made of clear acrylic, some light is scattered throughout its interior.

Figure 5:
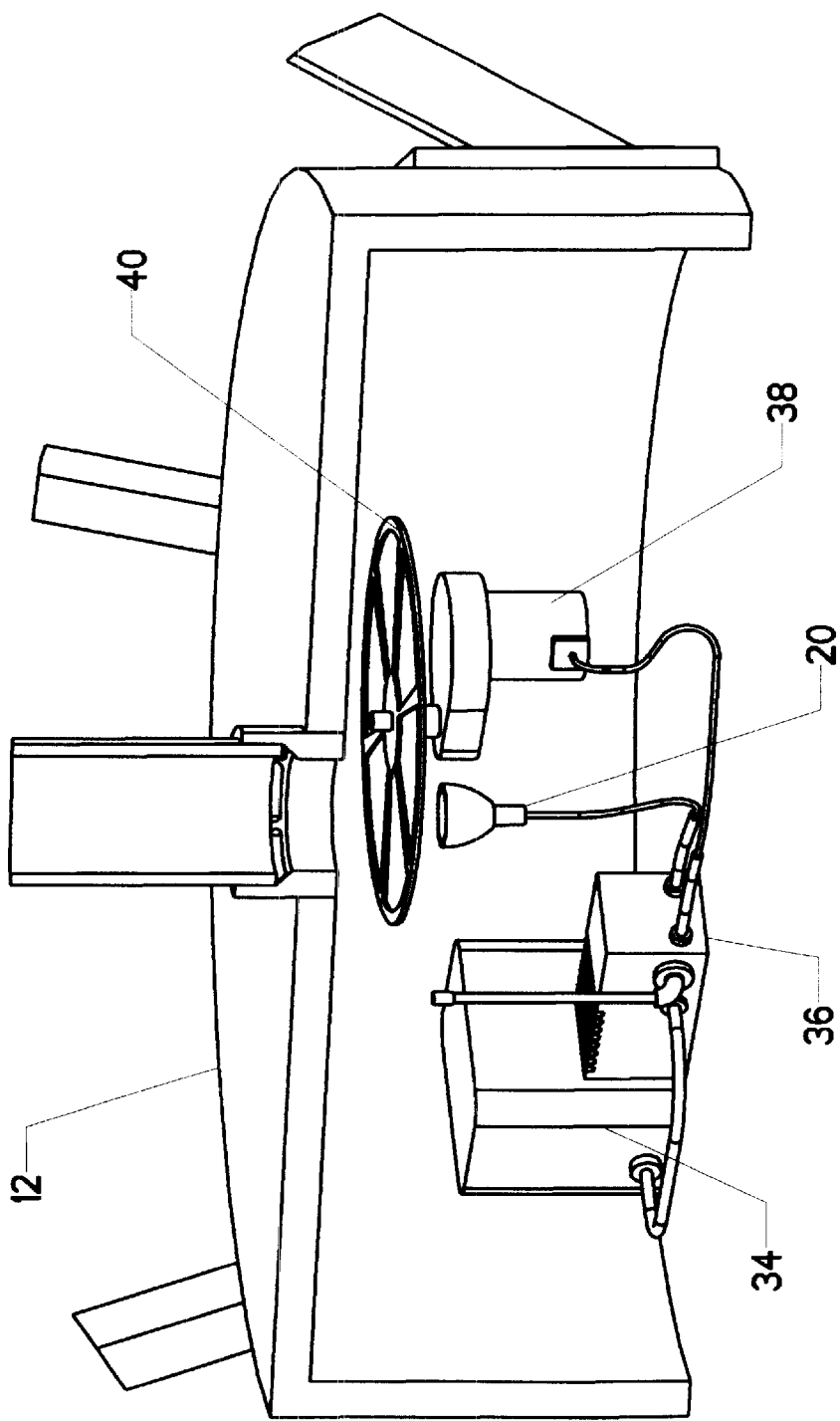
FIG. 5 is a detail view, showing the components housed within the base of the table.
Figure 8:
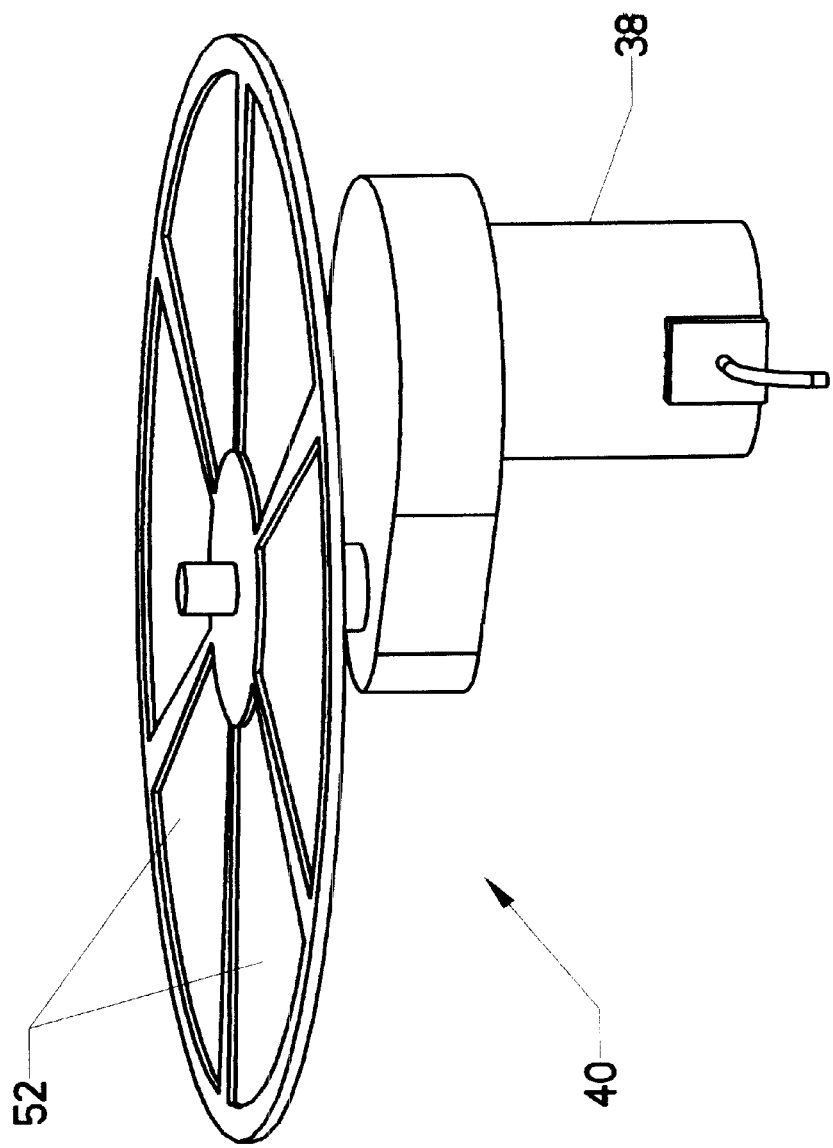
FIG. 8 is an isometric view, showing the details of the color filters employed.

Additional visual effects may be created by varying the intensity and color of light source 12. Turning to FIG. 5, the components for achieving this goal will be described. Color wheel 40 is placed over light source 20. Turning briefly to FIG. 8, the reader will observe that color wheel 40 has a plurality of different color filters —such as red, blue, green etc. As it is turned, different filters are brought into place over light source 20.

Returning now to FIG. 5, the reader will observe that color wheel 40 is connected to gear motor 38, which rotates color wheel 40 to any desired position. Gear motor 38 is actuated by control module 36. Control module 36 directs gear motor 38 to rotate color wheel 40 to a desired position (including continuous rotation). Control module 36 also provides electrical power to light source 20. The voltage can be increased and decreased to vary the intensity of light source 20. Control module 36 is therefore capable of creating many different visual effects. As one example, control module 36 can place a blue filter over light source 20. The intensity of light source 20 can then be reduced while a red filter is rotated into place. The result will be a slow "fade" to a new color.

Battery 34 provides power to control module 36, and ultimately to the other components. Although the invention could be powered via an AC line, the use of battery 34 allows many tables to be place in a dining area without concern over power cords.

Control module 36 is provided with a radio receiver so that it can be remotely commanded. The reader should appreciate that numerous tables 10 will often be employed in a particular entertainment installation. Each control module 36 within each table 10 can then be controlled via a central control unit. In this way, the illumination effects can be synchronized with music or other entertainment media to create a pleasing visual display. While not essential to the invention, it is helpful to employ a computer as the central control unit. In this fashion, simple software changes may be used to vary the visual effects created.

All the components shown within base 12 are fixed by conventional means. It is advantageous to contain them all within one electronics enclosure. In this fashion, all the components may be installed and removed from base 12 as an integral unit. It also facilitates cooling, safety assurances, etc. As such an enclosure is well known in the prior art, it has not been illustrated.

Figure 6:
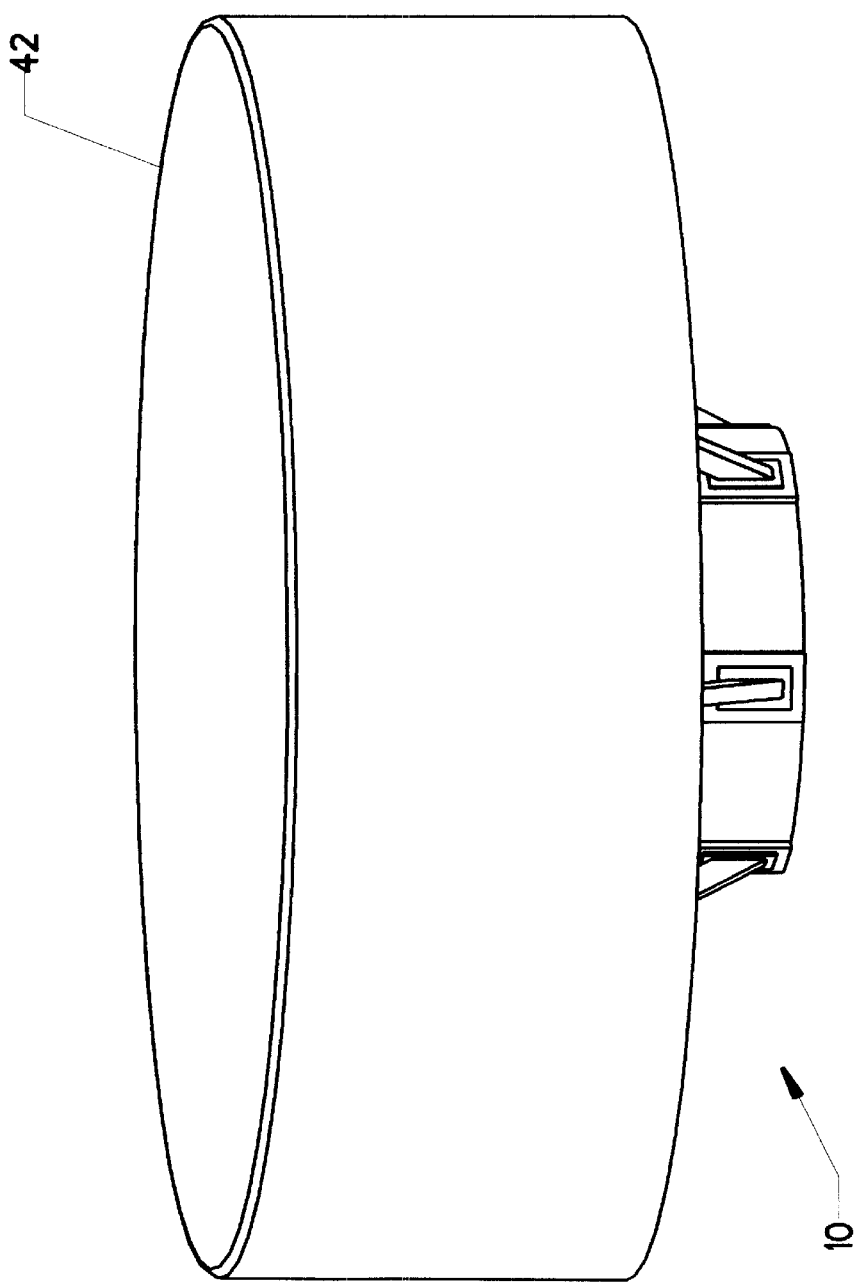
FIG. 6 is an isometric view, showing how a table cloth is placed on the table.

FIG. 6 shows table 10 as it would normally be presented to the public. Table 10 is covered with table cloth 42. Table cloth 42 is ideally translucent. Linen has been found to be particularly effective. The reader will recall the light diffusing properties of column 16. When light source 20 is turned on, table cloth 42 will be internally illuminated in a very uniform fashion. As long as table cloth 42 is made of translucent material, this internal illumination will be readily apparent, resulting in a visually striking effect.

Figure 7:
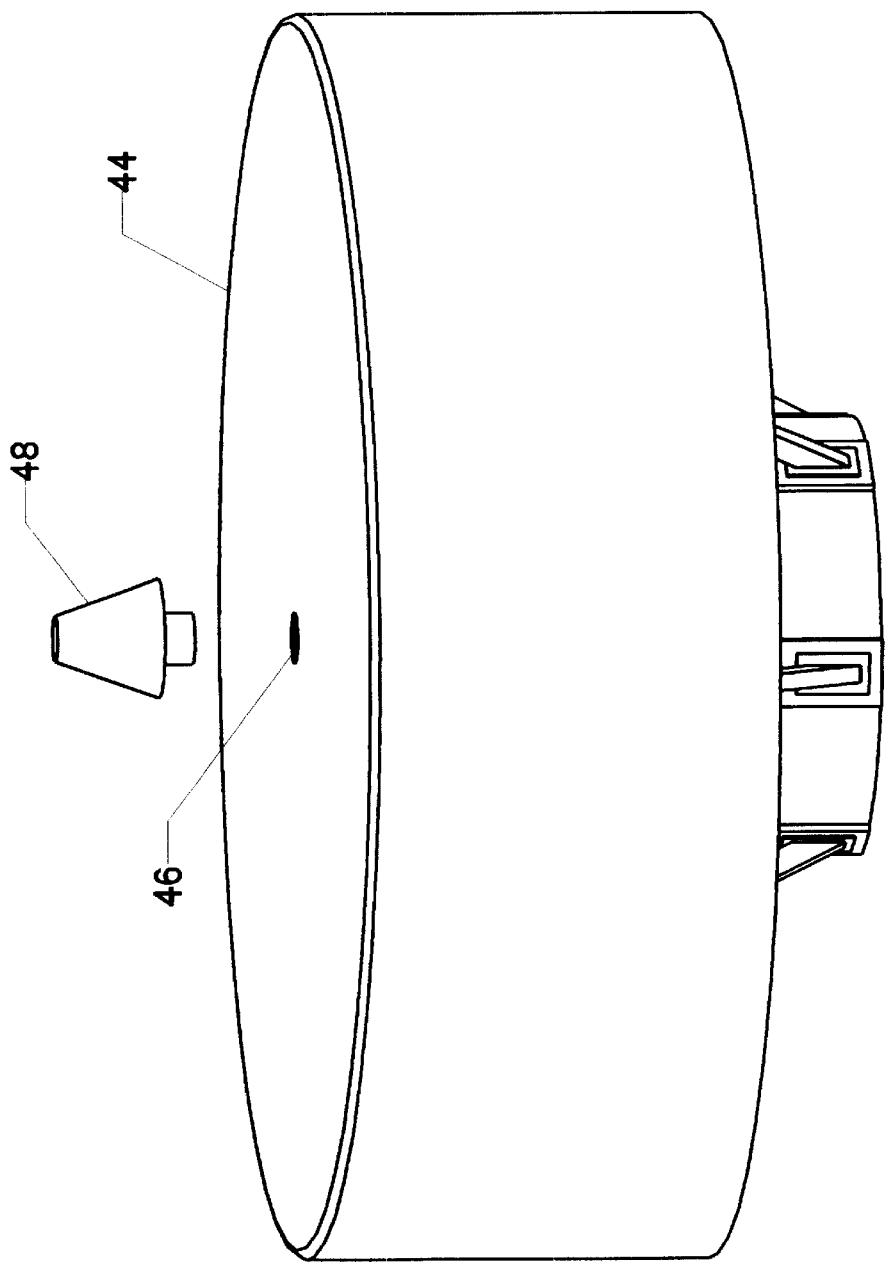
FIG. 7 is an isometric view, showing how an optional illuminated centerpiece may be invention.

Returning briefly to FIG. 2, the reader will recall that top 14 has an opening - center hole 32. This opening produces a bright spot in the middle of table cloth 42. FIG. 7 illustrates modified table cloth 44. Modified table cloth 44 has cloth hole 46 cut into its center. Cloth hole 46 is placed over center hole 32. This gains access to column interior 22 of column 16. A center piece 48 can then be placed into cloth hole 46. The reader will observe that center piece 48 has a downward extending cylindrical portion sized to fit snugly within center hole 32, thereby holding center piece 48 in place.

The exterior of center piece 48 can be given the same diffusing surface as found on outer surface 28 of column 16. Thus, the light escaping upward through cloth hole 46 is captured and diffused by center piece 48, with the result that it takes on the same color and intensity of the entire table. Those skilled in the art will realize that many different types of center pieces 48 can be made via hand or mass production techniques. In addition, a conventional center piece such as a glass bowl filled with water or other objects can be employed.

Summary, Ramifications, and Scope

Accordingly, the reader will appreciate that the proposed invention can provide a visually striking table structure. The invention has further advantages in that it:

1. Provides for changes in the intensity and color of the illumination;

2. Provides means for remotely controlling the intensity and color of the light source within the table in order to synchronize the visual effect with music or other entertainment; and 3. Provides for the addition of an internally illuminated centerpiece.

Although the preceding description contains significant detail, it should not be construed as limiting the scope of the invention but rather as providing illustrations of the preferred embodiment of the invention. As an example, many different types of transparent materials could be substituted for the clear acrylic employed in the invention. Likewise, many different surface treatments could be employed to obtain the diffusing properties of outer surface 28. Thus, the scope of the invention should be fixed by the following claims, rather than by the examples given.

Having described my invention, I claim:

1. A lighted table, comprising:
   a. a base;
   b. a top;
   c. a hollow vertical column connecting said top to said base, wherein said cowman made of a transparent material, and wherein said column's inner surface is smooth, but said column's outer surface is finely textured;
   d. a light source, located within said base, and oriented to transmit light up through the interior of said column, so that said transmitted light strikes said inner surface of said column along a substantial portion of the height of said column, passes through said column, and radiates outwardly from said outer surface of said column.

2. The device as recited in claim 1, further comprising control means for varying the intensity of said fight source.

3. The device as recited in claim 1, further comprising:
   a color wheel, positioned over said light source, wherein said color wheel comprises a plurality of different color filters, so that when said color wheel is rotated, the color of said transmitted light being diffused outward from said column changes.

4. The device as recited in claim 3, further comprising control means for rotating said color wheel so as to place a desired color filter over said light source.

5. The device as recited in claim 2, wherein said control means is capable of receiving instructions from a remotely located central control unit.

6. The device as recited in claim 4, wherein said control means is capable of receiving instructions from a remotely located central control unit.

7. The device as recited in claim 1, further comprising a translucent table cloth placed over said top, and descending downward from said top around the perimeter of said top.

8. The device as recited in claim 1 wherein the upper extremity of said hollow vertical column opens into a center hole, and further comprising:
   a. a modified table cloth, being positioned over said top, and having a cloth hole passing completely therethrough and positioned over said center hole in said upper extremity of said column; and
   b. a translucent center piece positioned over said cloth hole.

* * * * *